Oct. 14, 1958     L. N. JOHNSON     2,856,091
BOAT TRAILER

Filed Sept. 26, 1955     7 Sheets-Sheet 1

INVENTOR.
Lawrence N. Johnson
BY Struhlwells
Atty.

Oct. 14, 1958     L. N. JOHNSON     2,856,091
BOAT TRAILER Filed Sept. 26, 1955     7 Sheets-Sheet 2

INVENTOR.
Lawrence N. Johnson
BY
Atty.

Oct. 14, 1958 — L. N. JOHNSON — 2,856,091
BOAT TRAILER

Filed Sept. 26, 1955 — 7 Sheets-Sheet 4

INVENTOR.
Lawrence N. Johnson
BY
Atty.

Oct. 14, 1958   L. N. JOHNSON   2,856,091
BOAT TRAILER
Filed Sept. 26, 1955   7 Sheets-Sheet 5

INVENTOR.
Lawrence N. Johnson
BY
Greek Wells
Atty.

Oct. 14, 1958 — L. N. JOHNSON — 2,856,091
BOAT TRAILER
Filed Sept. 26, 1955 — 7 Sheets-Sheet 7

INVENTOR.
Lawrence N. Johnson
BY
Atty.

United States Patent Office 2,856,091
Patented Oct. 14, 1958

2,856,091

BOAT TRAILER

Lawrence N. Johnson, Spokane, Wash.

Application September 26, 1955, Serial No. 536,490

11 Claims. (Cl. 214—506)

The present invention relates to improvements in boat trailers.

It has become common practice in recent years for fishermen and boating enthusiasts to transport their boats to and from the lakes and rivers they frequent, rather than provide storage means for them at those places as has been the custom in the past. With the growth of this custom, it has become increasingly more important to devise a boat carrying trailer which is adapted for easy and quick launching and reloading of its burden. Also since modern boats of the type which permit relatively easy transportation are constructed of many different sizes and shapes, it has become necessary to design a boat trailer which may be easily adjusted to fit many different boat designs.

It has been a common practice to launch and load the boat by backing the trailer out into the water a sufficient distance to float the boat either on or off. This practice is not satisfactory, however, since there are few places where the shoreline is suited to such an operation. In addition, immersing the trailer in the water "drowns" the wheels and floods their bearings. In order to avoid the problems involved in launching by immersing the trailer, some manufacturers have designed trailers having freely rotatable rollers upon which the boat is supported. With this construction, the boat may be launched by backing the trailer to the water's edge and tipping the rear end down to allow the boat to slide off. While this method of launching has been found quite practical, it has greatly complicated trailer design. It is very difficult and expensive to provide a supporting bed of transverse rollers which will adequately support the boat, and which may be altered when desired to fit different boat designs.

It is the principal purpose of my invention to provide a boat trailer having a load carrying frame, a keel supporting boom which will support the full length of the boat keel, transversely spaced longitudinally extending bunks for supporting a substantial portion of the hull, means for tilting the load carrying frame and the boom with respect to the towing tongue, and means for lifting the boat free of the supporting bunks for easy sliding onto and off of the boom.

A further purpose of the invention is to provide such a trailer wherein the load carrying frame is adjustable longitudinally with respect to the boom to accommodate boats of varying sizes and wherein the hull supporting bunks are adjustable to properly support hulls of varying designs.

A still further purpose of the invention is to provide a trailer wherein the boom, tongue and load carrying frame may each be disconnected for easy storing.

The nature and advantages of my invention will appear more clearly from the following description and the accompanying drawings wherein the preferred forms of the invention are shown. The drawings and description are illustrative only, however, and are not intended to limit the invention except insofar as it is limited by the claims.

Figure 1:
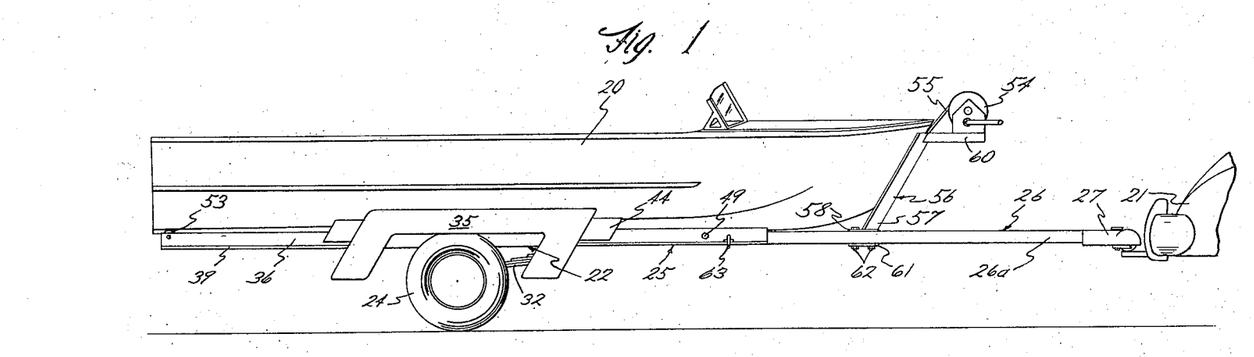
Figure 1 is a side elevational view of my improved trailer with a boat loaded thereon for transport.
Figures 2, 7:
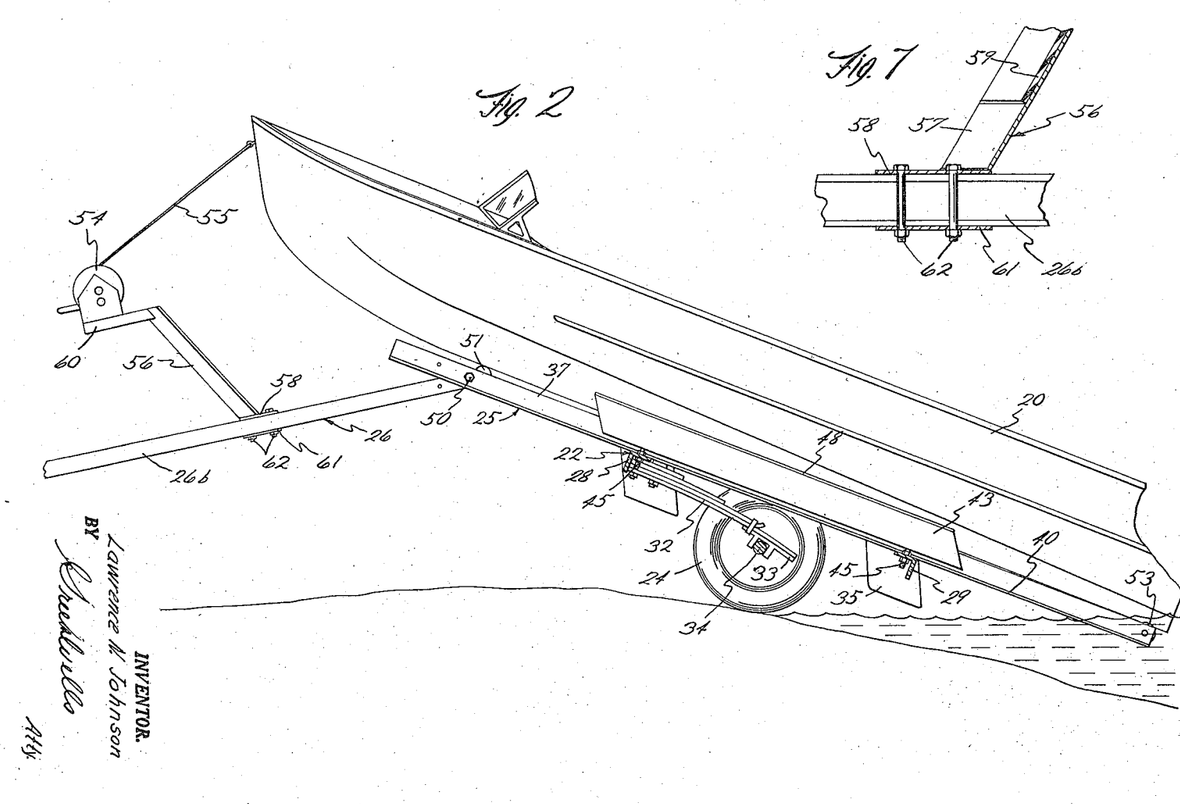
Figure 2 is a side view of the trailer in position to launch the boat supported thereon.
Figure 7 is an enlarged sectional view taken on the line 7—7 of Figure 3.
Figures 3, 5, 6:
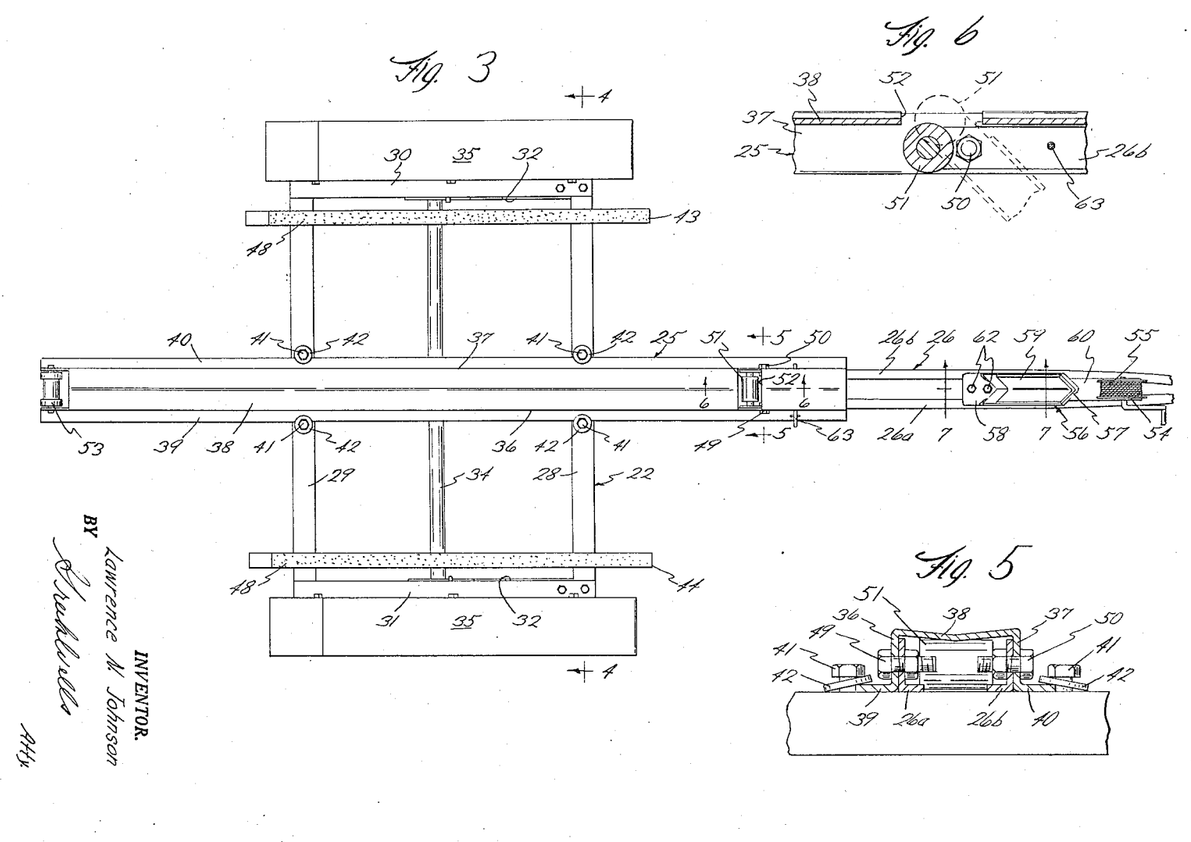
Figure 3 is a plan view of the trailer shown in Figures 1 and 2.
Figure 5 is an enlarged fragmentary sectional view taken on the line 5—5 of Figure 3.
Figure 6 is an enlarged sectional view taken on the line 6—6 of Figure 3.

Referring now to the drawings, and to Figures 1, 2 and 3 in particular, my improved boat trailer is designed for transportation of small boats of the outboard or runabout class such as the craft indicated by the numeral 20. The trailer is adapted to be towed behind a motor vehicle such as that indicated at 21 in Figure 1. The trailer itself is comprised of a rectangular load carrying frame 22 supported on wheels 23 and 24. The frame 22 has a boom 25 thereon, to which a towing tongue 26 is mounted. The tongue 26 carries at its forward end a hitch 27 by which it is connected to the vehicle 21.

The load carrying frame 22 is comprised of a pair of spaced apart transverse frame members 28 and 29, which are connected at their outer ends by longitudinal members 30 and 31. As best illustrated in Figure 2, leaf springs 32 are bolted to the front corners of the frame 22 and extend rearwardly and downwardly beneath the longitudinal members 30 and 31. At the free ends of each of the springs 32, an axle attaching bracket 33 is fixed. An axle 34 is secured to each of the brackets 33 and extends transversely under the frame 22. The wheels 23 and 24 are rotatably mounted at the ends of the axle 34. Fenders 35 are bolted to the members 30 and 31 and extend over the wheels 23 and 24 to complete the load carrying portion of the trailer.

The boom 25 of the trailer is positioned at the center of the frame 22 and extends forwardly and rearwardly therefrom. The boom 25 is a channel shaped metal beam having two spaced apart side walls 36 and 37 connected by a top wall 38. A pair of horizontal flanges 39 and 40 extend outwardly from the lower edges of the walls 36 and 37. As best shown in Figure 5, the top wall 38 is depressed at the center to form a shallow trough to receive the keel of the boat 20. The boom 25 is secured on the frame 22 by bolts 41 which are mounted on the transverse frame members 28 and 29. The bolts 41 do not pass through the flanges 39 and 40 of the boom 25, but have large washers 42 thereon which extend over the flanges 39 and 40. When the bolts 41 are tightened down, the washers 42 clamp the flanges 39 and 40 rigidly to the members 28 and 29, thereby securing them. With this construction it is possible to move the boom 25 longitudinally of the frame 22 to whatever position is desired.

Figure 4:
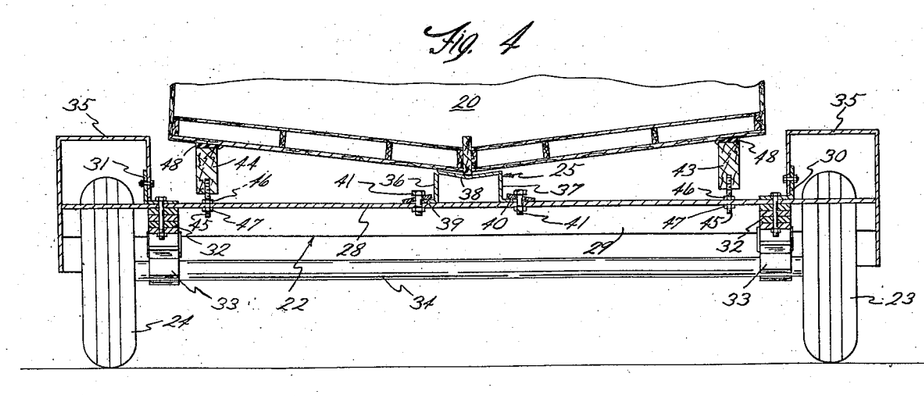
Figure 4 is an enlarged sectional view taken substantially on the line 4—4 of Figure 3.
Figure 8:
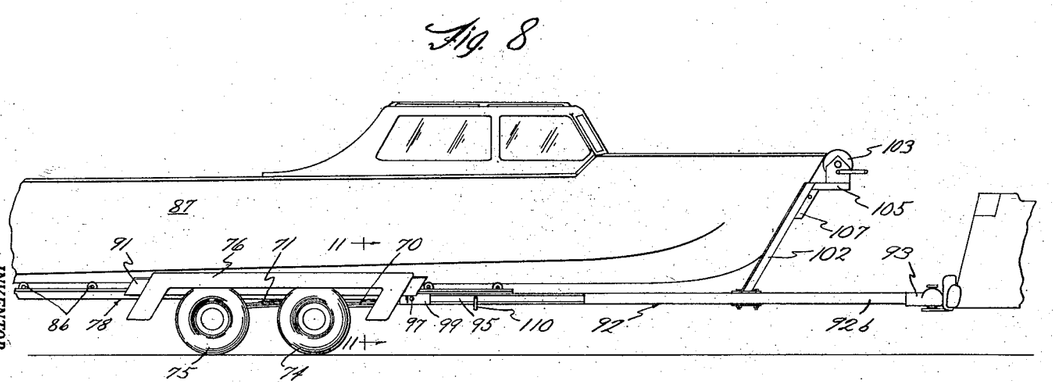
Figure 8 is a side elevational view of a modified form of the invention adapted to transport larger and heavier boats.
Figure 9:
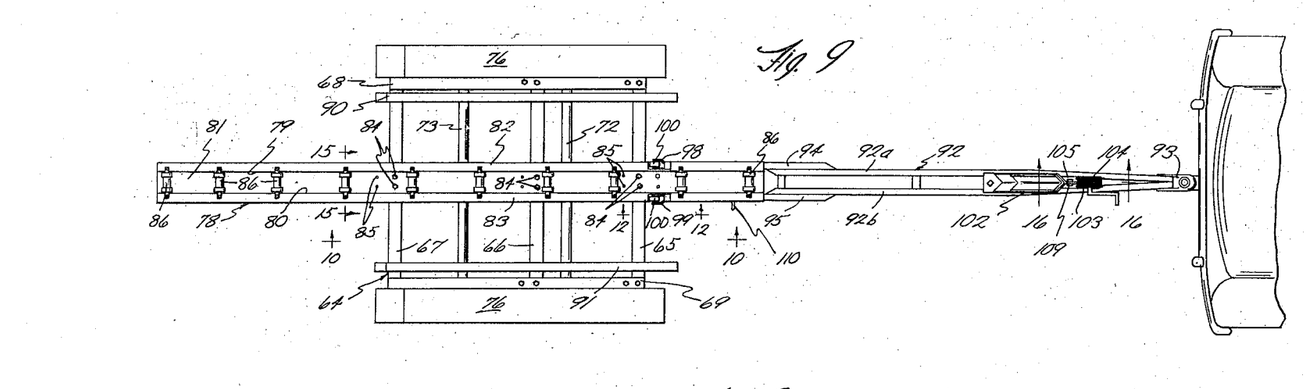
Figure 9 is a plan view of the trailer shown in Figure 8.
Figure 10:
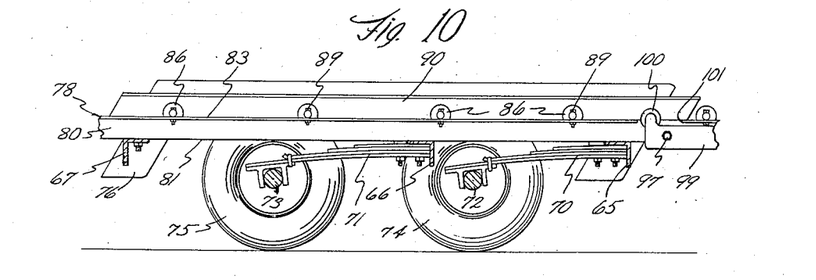
Figure 10 is an enlarged fragmentary sectional view taken on the line 10—10 of Figure 9.
Figure 11:
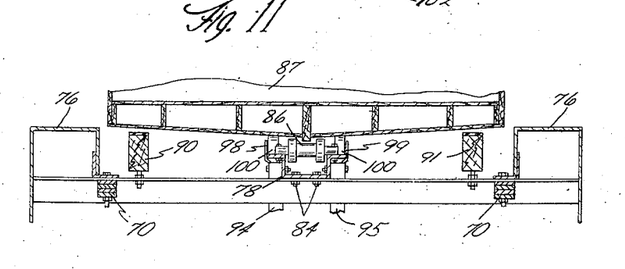
Figure 11 is an enlarged fragmentary view taken substantially on the line 11—11 of Figure 8 except showing the trailer tilted for launching.

To assist the boom 25 in rigidly supporting the hull of the boat 20, a pair of longitudinally extending bunks 43 and 44 are provided. The bunks 43 and 44 are positioned near the longitudinal members 30 and 31 on the frame 22. As best shown in Figure 4, each of the bunks 43 and 44 has a bolt 45 threaded therein near each end, and extending downwardly therefrom. The bolts 45 extend through apertures in the front and rear transverse frame members 28 and 29, and are secured by nuts 46 and 47. The nuts 46 are positioned above the frame members 28 and 29 and the nuts 47 below. By adjusting the nuts 46 and 47 up and down on the bolts 45, the bunks 43 and 44 may be secured at any desired height. Soft padding 48 is fixed to the upper surface of each bunk 43 and 44 to prevent damage to the hull of the boat 20.

To enable the boat 20 to be easily launched and loaded, means must be provided to tilt the load carrying frame 22 so that the rear edge of the boom 25 rests in the water. To accomplish this without unhitching the trailer from the motor vehicle 21, a novel pivot is included between the tongue 26 and the boom 25. The tongue, constructed of two channel members 26a and 26b, extends rearwardly a short distance behind the front end of the boom 25 between the side walls 36 and 37 thereof. A pair of pivot bolts 49 and 50, best shown in Figure 5, pivotally secure the tongue members 26a and 26b to the side walls 36 and 37 of the boom 25. With this construction the load carrying frame 22 and boom 25 may be tilted as shown in Figure 2 by lifting at the front end of the boom 25.

Since the boat 20 rests upon the boom 25 and bunks 43 and 44, considerable friction is present to prevent sliding. When the trailer is tilted as shown in Figure 2, this friction is undesirable. To provide for easy sliding when the trailer is in tilted position, a novel lifting roller construction is incluuded. At the rear edge of the tongue 26 and spaced rearwardly of the pivot bolts 49 and 50, a lifting roller 51 is positioned. The roller 51, best shown in Figure 6, is rotatably mounted between the rear ends of the tongue members 26a and 26b. An aperture 52 is formed in the top wall 38 of the boom 25 directly above the roller 51. As shown by the dotted lines in Figure 6, when the trailer is tilted, the roller 51 is caused to rise through the aperture 52. When the roller rises, it engages the keel of the boat 20, and lifts it free of the boom 25 and the bunks 43 and 44. A second roller 53 mounted between the side walls 36 and 37 of the boom 25 and protruding above the top wall 38, supports the rear portion of the keel of the boat 20, so that when the roller 51 is raised, the boat 20 is supported entirely free for easy sliding. When the trailer is returned to travelling position, the roller 51 is lowered through the aperture 52 and the keel is allowed to rest on the boom 25.

A launching and loading winch 54 is mounted on the tongue 26 and has a cable 55 thereon which may be connected to the boat 20 to east it onto and off of the trailer. The winch 54 is mounted on a winch stand 56. The stand 56, shown best in Figure 7, comprises an angle iron 57 extending upwardly at an angle from a base plate 58. The angle iron 57 is positioned so that it presents a V-shaped bow rest for the boat 20. A soft pad 59 secured to the angle iron 57 prevents injury to the boat. The winch 54 is mounted on a horizontal bracket 60 welded to the top of the angle iron 57. To accommodate boats of varying lengths, the winch stand 56 is mounted for longitudinal adjustment on the tongue 26. The base plate 58 rests upon the tops of the members 26a and 26b, and a second plate 61 is positioned beneath the members 26a and 26b. Bolts 62 extend from the plate 58 to the plate 61, and by tightening them down, the plates 58 and 61 may be clamped rigidly to the members 26a and 26b to secure the stand.

The use of the trailer is very simple. When a boat 20 is to be fitted on, the center of gravity of the boat is determined, and the load carrying frame 22 is adjusted with respect to the boom 25 so that when the stern rests upon the rear roller 53, the frame 22 resides slightly behind the center of gravity of the boat. The bolts 41 are then tightened down to secure the load carrying frame 22 to the boom 25. The bunks 43 and 44 are next adjusted to engage and support the hull of the boat 20 by means of the bolts 45 and nuts 46 and 47. The winch stand 56 is adjusted to fit the bow and tightened in place. With the trailer so adjusted, the boat may be loaded and transported as desired. Since the center of gravity of the boat is positioned forward of the wheels 23 and 24, there is no tendency for the trailer to tilt while traveling, but as a safety measure, a latch pin 63 may be inserted in aligned apertures drilled through the tongue 26 and boom 25 to secure against tilting. Also, if the winch cable 55 is secured to the boat and wound tight on the winch 54, tilting will be prevented.

When the boat 20 is to be launched, the trailer is backed up until the wheels 23 and 24 are at the water's edge as shown in Figure 2. The latch pin 63 is removed and the cable 55 slackened. The operator then grasps the front of the boat and lifts it to tilt the boom 25. If the load carrying frame 22 has been properly adjusted with respect to the center of gravity of the boat 20, a force of 25 lbs. should be sufficient to lift the front of the boom 25. As the boom 25 is tilted so that its rear edge is immersed, the lifting roller 51 rises and lifts the boat 20 clear of the boom 25 and takes the weight from the bunks 43 and 44. Now by merely unwinding the cable 55, the boat may be slid down the boom 25 into the water. When it has slid back far enough to drop off the lifting roller 51, the sharpening curve of the hull toward the front will have moved adjacent the bunks 43 and 44 so that they will not engage.

Loading of the boat is accomplished just as simply. The empty trailer is tilted until the rear of the boom 25 rests in the water and the boat floated to it. The cable 55 is attached and the boat is drawn up the boom 25 riding on the rear roller 53 and the top wall 38 of the boom 25. The keel rides up onto the lifting roller 51 when it reaches it, and lifts the hull so that it may be drawn over the bunks. When the boat is in place, the trailer may be eased down and the latch pin 63 inserted. The boat is then ready for travel, being supported by the boom 25 and bunks 43 and 44, and secured against rearward movement by the cable 55.

Figures 8 through 16 illustrate a modified form of the invention which, although identical in theory and operation, is designed for use with considerably larger and heavier boats. In this form of the invention, the trailer comprises a load carrying frame 64 having three spaced apart transverse frame members 65, 66 and 67 tied at their ends by longitudinal members 68 and 69. Front leaf springs 70 are bolted at the intersections of the frame member 65 with the members 68 and 69, and rear leaf springs 71 are bolted at the intersections of the frame member 66 with the members 68 and 69. The front leaf springs 70 mount a front axle 72 and the rear springs 71 mount an axle 73 in the same manner as in the main form. Wheels 74 are rotatably mounted on the axle 72 and wheels 75 are rotatably mounted on the axle 73 to support the load carrying frame 64. Fenders 76 are provided over the wheels 74 and 75.

Figure 15:
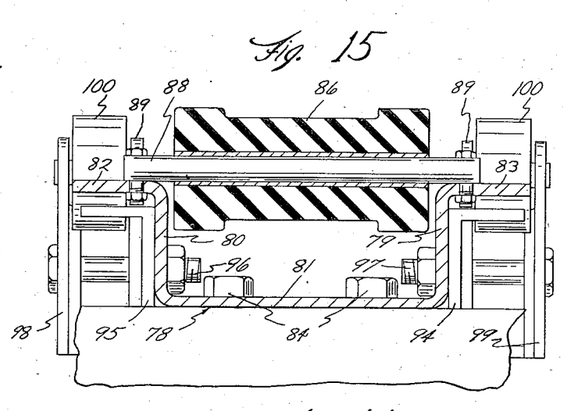
Figure 15 is an enlarged fragmentary sectional view taken on the line 15—15 of Figure 9.

A longitudinal boom 78 is positioned at the center of the frame 64. The boom 78 is constructed similar to the boom 25 except that it is inverted, having spaced side walls 79 and 80, a bottom wall 81 and horizontal flanges 82 and 83 at the top of the side walls 79 and 80. The boom 78 is secured to the frame 64 by bolts 84 which extend through apertures 85 in the bottom wall 81 of the boom 78 and the transverse members 65, 66 and 67. There are several series of apertures 85 in the boom 78 to permit longitudinal adjustment of the load carrying frame. A series of keel rollers 86 are provided on the boom 78 to support the keel of a boat 87 to be transported. The rollers 86, as shown in Figure 15, are rotatably mounted on axles 88 which extend between the flanges 82 and 83 of the boom 78. Bolts 89 running through the flanges 82 and 83 and the axles 88 secure the rollers in place. With this construction, proper support may be given to the keel of the boat 87 regardless of its shape, since by placing spacer washers on the bolts 89, any of the axles 88 may be raised to whatever height is necessary to engage the keel.

As in the main form of the invention, bunks 90 and 91 are provided to support the hull of the boat 87. The bunks 90 and 91 are mounted to the members 65, 66 and 67 for vertical adjustment as earlier described.

A towing tongue 92 is mounted to the front of the boom 78 and has a hitch 93 thereon by which the trailer may be secured for towing. The tongue 92 is constructed of two spaced apart channel members 92a and 92b which converge at the front to mount the hitch 93. At the rear of the members 92a and 92b, a pair of channel iron extensions 94 and 95 are secured. The extensions 94 and 95 extend rearwardly under the flanges 82 and 83 of the boom 78 for a short distance, and are pivoted to the side walls 79 and 80 by bolts 96 and 97. With this construction, tilting of the frame 64 and boom 78 may be obtained as in the main form.

Figure 12:
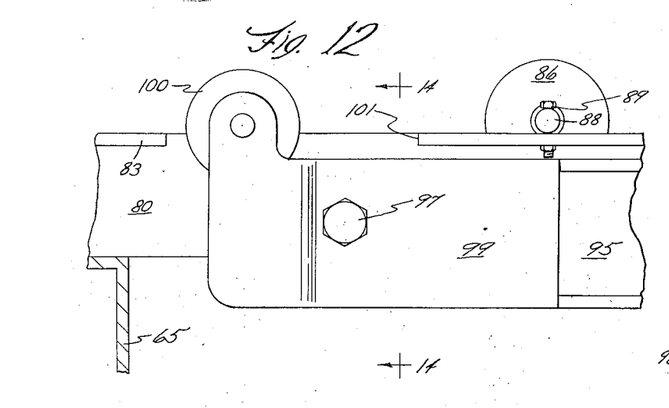
Figure 12 is an enlarged fragmentary sectional view taken on the line 12—12 of Figure 9.
Figure 13:
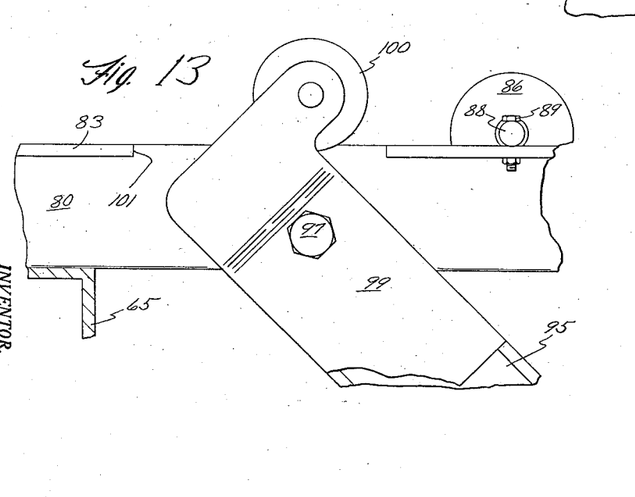
Figure 13 is a view similar to Figure 12 except illustrating the trailer tilted for launching.
Figure 14:
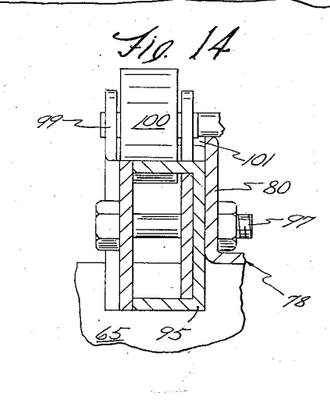
Figure 14 is a fragmentary sectional view taken on the line 14—14 of Figure 12.

Lifting roller means are also provided in this form of the invention, to raise the boat 87 from the bunks 90 and 91 when the trailer is tilted for launching and loading. At the rear end of each of the extensions 94 and 95, a pair of roller brackets 98 and 99 are fixed. A lifting roller 100 is rotatably mounted between each pair of brackets 98 and 99. As shown in Figures 12, 13 and 14, the rollers 100 are positioned immediately outside the side walls 79 and 80. The flanges 82 and 83 are notched at 101 to admit the rollers 100. When the trailer is in the transporting position and the boom 78 and tongue 92 are aligned, the rollers 100 are positioned slightly below the level of the keel roller 86. However, when the boom 78 is tilted for launching, the rollers 100 rise to the position shown in Figures 11 and 13 and lift the hull of the boat 87 free of the bunks 90 and 91, so that it may move freely over the rollers 86 into the water.

Figure 16:
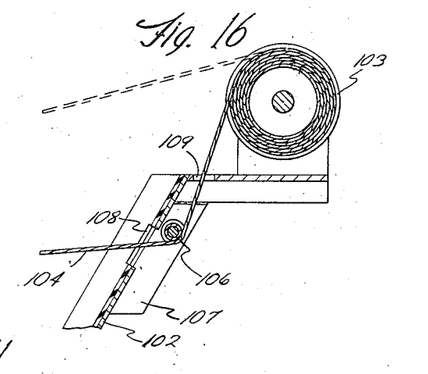
Figure 16 is an enlarged fragmentary sectional view taken on the line 16—16 of Figure 9.
Figure 17:
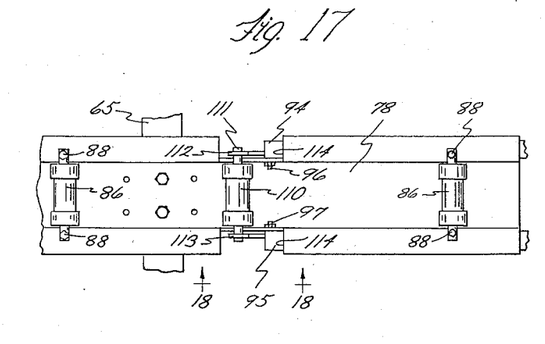
Figure 17 is a fragmentary plan view of the trailer shown in Figure 8 illustrating a slightly modified lifting roller construction.
Figure 18:
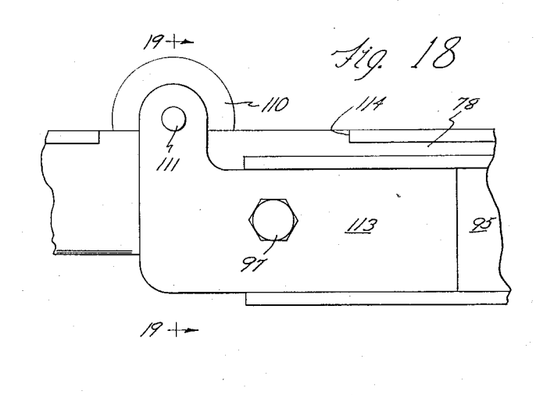
Figure 18 is an enlarged fragmentary elevational view looking in the direction of the arrows 18—18 of Figure 17.
Figure 19:
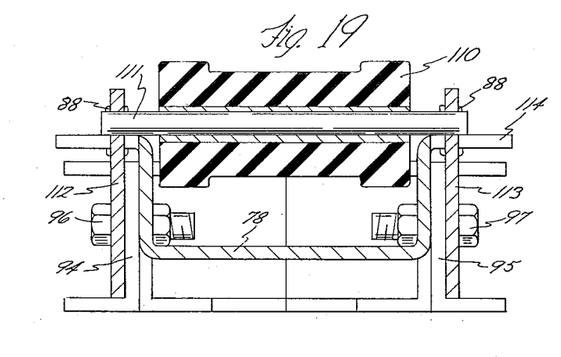
Figure 19 is a sectional view taken on the line 19—19 of Figure 18.

As in the main form of the invention, a winch stand 102 is included on the tongue 92 for loading and launching the boat 87, and to provide a bow support. The winch stand 102 is identical in construction to the stand 56 and is longitudinally adjustable in the same manner. A winch 103 having a cable 104 is mounted on a bracket 105 secured to the stand 102. However, to accommodate boats having different bow heights, means are included on the stand 102 for drawing the cable 104 from two different levels. For larger boats, the cable is extended directly from the bow to the winch, but for smaller boats it is desirable to draw the cable 104 at a lower level. To accomplish this, an idler pulley 106 is mounted between brackets 107 secured to the stand 102 below the winch bracket 105, as shown in Figure 16. An aperture 108 is cut in the stand 102 adjacent the pulley 106, and a second aperture 109 is cut in the winch bracket 105 above the pulley 106. The cable 104 may be threaded down through the aperture 109, around the pulley 106 and through the aperture 108 when desired, to pull from a low level.

The operation of the modified form of the trailer is identical to that of the main form. The load carrying frame 64 may be adjusted with respect to the boom 78 so that the loaded boat 87 is positioned with its center of gravity slightly forward of the frame 64. The bunks 90 and 91 are adjustable to properly support the boat 87, and the winch stand 102 may be moved longitudinally to receive the bow of the boat 87.

Launching and loading of the boat 87 is accomplished by tilting the boom 78 and causing the rollers 100 to rise and lift the boat 87 free of the bunks. Movement onto and off of the boom 78 may be controlled by the winch 103 and cable 104. When the trailer is in transporting position, the weight of the boat 87 and the tightened cable 104 prevent tilting. As a safety measure, a latch pin 110 may be passed through the tongue 92 and boom 78 to further insure against tilting.

Figures 17-20 illustrate further modification of the invention wherein a slightly modified lifting roller construction for the trailer shown in Figures 8-16 is employed. This modified form of the invention utilizes a roller 110, identical to the keel rollers 86, for lifting the hull of the boat 87, rather than the rollers 100, shown in Figures 8-16. The lifting roller 110 is mounted on a shaft 111 which extends between the flanges 82 and 83 in the same manner as the shafts 88 of the rollers 86. The shaft 111 is supported at its ends by brackets 112 and 113 which extend upwardly through apertures 114 in the flanges 82 and 83. The brackets 112 and 113 are secured to the extensions 94 and 95 of the tongue 92. As may be seen in Figures 17, 18 and 20, the brackets extend rearwardly of the pivot bolts 96 and 97.

Figure 20:
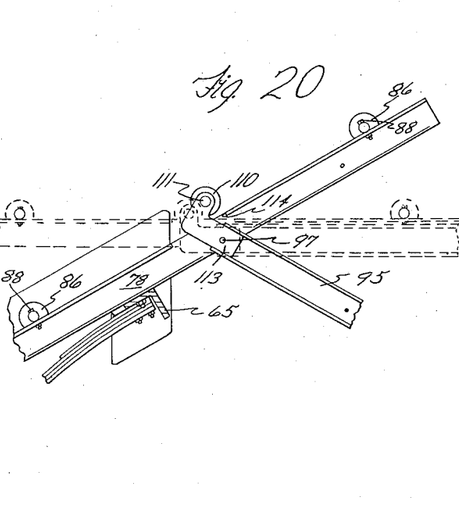
Figure 20 is a fragmentary elevational view of the trailer shown in Figure 8 illustrating the position of the lifting roller when the trailer is tilted for launching.

The construction just described operates in the same manner as the lifting rollers 51 or 100 in the other forms of the invention. As shown in Figure 20, tilting of the boom 78 with respect to the tongue 92 causes the roller 110 to be raised above the level of the other keel rollers 86, thus lifting the hull of the boat 87 to clear it from the supporting bunks 90 and 91 for easy launching or loading.

My improved trailer may be used to launch or load boats at any point where it is possible to back the trailer to the water's edge. The slope of the bed of the lake or river is immaterial so long as there is sufficient depth to float the boat. Even steep banks may be used as launching sites provided that the bank is low enough that the rear of the boom 25 or 78 can reach down to the water when tilted. Since the wheels of the trailer do not have to enter the water, docks and wharves may also be used for launching or loading.

My improved trailer will also load or unload a boat on the ground when desired without damage to the hull. When loading from the ground, the trailer pulls itself under the boat as the winch is wound, so that the boat's hull is not scraped. When unloading, the trailer may be pulled out from under the boat so that it is allowed to settle without scraping or thumping down.

The construction of the trailer as described hereinbefore is such that whenever the trailer has the boat removed it automatically assumes travelling position. The tongue and boom line up because the center of gravity is forward of the wheel line. When pull is applied to the tongue the pull also holds the tongue and boom in alignment. Thus whenever the trailer is being hitched to or hauled it assumes road position with the tongue and boom aligned.

The trailer is also extremely easy to store in a small space, since the load carrying frame, the boom, and the tongue may each be disconnected.

It is believed that the nature and advantages of my invention appear clearly from the foregoing description.

Having thus described my invention, I claim:

1. A boat trailer comprising a load carrying frame, wheels supporting said frame, a longitudinal keel supporting boom supported on said frame, a tongue pivoted for vertical angular movement to the boom near the front end thereof, hull supporting bunks mounted on said load carrying frame, and roller means supported on said tongue behind the pivot operable to rise above the keel supporting boom when the rear end of the boom is pivoted downward with respect to the tongue whereby to lift a boat supported on the trailer free of the hull supporting bunks.

2. A boat trailer comprising a load carrying frame, wheels supporting said frame, a keel supporting boom supported on the frame and extending forwardly in front of said wheels, transversely spaced hull supporting bunks on said frame, a tongue pivoted to the boom near the front end thereof for vertical angular movement with respect to the boom, and boat lifting means connected to the tongue behind the pivot movable upward from the boom to raise a boat carried on the trailer free of the hull supporting bunks when the rear end of the boom is tilted downward with respect to the tongue.

3. A boat trailer comprising a rectangular load carrying frame, wheels supporting said frame, a longitudinal keel supporting boom supported on said frame, transversely spaced hull supporting bunks mounted to said frame, a tongue having hitch means at its front end, pivot means having a horizontal transverse axis connecting the tongue to the boom near the front end thereof, said boom having a portion extending over the tongue in front of the pivot means whereby to prevent the rear end of the boom from pivoting upward with respect to the tongue, and boat lifting means connected to the tongue operable by pivotal movement of the tongue downwardly with respect to the boom to be moved upwardly above the boom to raise the front end of a boat supported on the trailer free of the hull supporting bunks.

4. A boat trailer comprising a load carrying frame, wheels supporting said frame, a keel supporting boom supported on the frame and extending forwardly and rearwardly beyond the frame, transversely spaced hull supporting bunks on said frame, a tongue pivoted to the boom near the front end thereof for vertical angular movement with respect to the boom, and boat lifting means connected to the tongue movable upward from the boom to raise a boat carried on the trailer free of the hull supporting bunks when the rear end of the boom is tilted downward with respect to the tongue, said boat lifting means comprising tongue portions extending rearwardly of the pivotal connection between the tongue and the boom, roller means rotatably mounted at the free ends of said portions, and cut out portions in the boom adjacent the roller means whereby to permit the roller means to pivot upwardly above the boom when the rear of the boom is tilted down with respect to the tongue.

5. A boat trailer comprising a rectangular load carrying frame, wheels supporting said frame, a longitudinal keel supporting boom supported on said frame for longitudinal adjustment thereon, transversely spaced longitudinally extending hull supporting bunks mounted to said frame for vertical adjustment thereon, a tongue having hitch means at its front end, pivot means having a horizontal transverse axis connecting the tongue to the boom near the front end thereof, said boom having a portion extending over the tongue in front of the pivot means whereby to prevent the rear end of the boom from pivoting upward with respect to the tongue, and boat lifting means connected to the tongue operable to raise the front end of a boat supported on the trailer free of the hull supporting bunks when the rear end of the boom is pivoted downward with respect to the tongue, said boat lifting means comprising tongue portions extending rearwardly of the pivotal connection between the tongue and the boom, roller means rotatably mounted at the free ends of said portions, and cut out portions in the boom adjacent the roller means whereby to permit the roller means to pivot upwardly above the boom when the rear of the boom is tilted down with respect to the tongue.

6. A boat comprising a rectangular load supporting frame, an axle mounted on said frame, wheels on said axle, a keel supporting boom supported on said frame, said boom having spaced apart side walls and a top wall, transversely spaced longitudinally extending hull supporting bunks mounted on said frame, a tongue having hitching means at its front end, said tongue having its rear end positioned between the side walls and beneath the top wall of the boom, horizontal transversely extending pivot means connecting the tongue to the boom, said pivot means being spaced rearwardly of the front end of the boom, tongue portions extending rearwardly of said pivot means, a lifting roller rotatably mounted at the rear ends of said portions, and the boom having an aperture in its top wall vertically aligned with said roller whereby to permit the roller to pass upwardly through the top wall when the rear end of the boom is tilted downwardly with respect to the tongue.

7. A boat trailer comprising a wheel supported load carrying frame, spaced apart longitudinal hull supporting bunks on said frame, a keel supporting boom positioned on said frame and extending longitudinally thereof, said boom having spaced apart vertical side walls and a top wall, said top wall being depressed at its center whereby to provide a trough to receive a boat keel, the side walls of said boom having outwardly extending horizontal flanges thereon, bolts passing through the frame adjacent said flanges, said bolts having washers thereon overlapping the flanges whereby to clamp the boom in place when the bolts are tightened, a tongue having hitching means at the front end thereof, said tongue extending rearwardly between the side walls and beneath the top wall of the boom, horizontal transversely extending pivot means connecting the tongue to the boom, said pivot means being spaced rearwardly of the front end of the boom, tongue portions extending rearwardly of said pivot means, a lifting roller rotatably mounted at the rear ends of said portions, and the boom having an aperture in its top wall vertically aligned with said roller whereby to permit the roller to pass upwardly through the top wall when the rear end of the boom is tilted downwardly with respect to the tongue.

8. In a boat trailer having a wheeled load supporting member, and a tongue for towing the trailer, means for launching a boat carried on the trailer comprising pivot means having a horizontal transverse axis connecting the tongue to the load supporting member, tongue portions extending rearwardly from said pivot means, and roller means rotatably mounted at the rear ends of said portions operable to rise above the load supporting member to lift a boat supported thereon when the rear end of the load supporting member is tilted downward with respect to the tongue whereby to free the boat from its supporting means.

9. A boat trailer comprising a rectangular load supporting frame, wheels supporting said frame, spaced apart hull supporting members on the frame, a keel supporting boom mounted on said frame for longitudinal adjustment thereon, said boom having spaced apart side walls and a bottom wall, a tongue having hitching means at its front end, said tongue having spaced apart rearwardly extending portions positioned adjacent the outside faces of the side walls of the boom, transverse pivot means connecting the rearwardly extending portions of the tongue to the boom, roller brackets secured to said portions and extending rearwardly of the pivot means, and rollers rotatably mounted on said brackets operable to rise above the boom when the rear of the boom is tilted downward with respect to the tongue whereby to lift a boat supported on the trailer clear of the hull supporting members.

10. A boat trailer comprising a rectangular load supporting frame, wheels supporting said frame, spaced apart hull supporting members on the frame, a keel supporting boom mounted on said frame for longitudinal adjustment thereon, said boom having spaced apart side walls and a bottom wall, said side walls having outwardly extending horizontal flanges at the top edges thereof, a plurality of longitudinally spaced transverse axles mounted between said flanges, keel supporting rollers rotatably mounted on said axles, a tongue positioned at the front of said boom, said tongue having spaced apart portions extending rearwardly adjacent the side walls of the boom and beneath the outwardly extending flanges, transverse pivot means pivoting said portions to the boom, roller brackets secured to said portions and extending rearwardly of the pivot means, lifting rollers mounted on said brackets, and notches in the outwardly extending flanges, said notches being vertically aligned with said rollers whereby to allow the rollers to pass upwardly above the boom upon tilting of the rear edge of the boom downward with respect to the tongue.

11. A boat trailer comprising a load carrying frame, wheels supporting said frame, a keel supporting boom supported on the frame and extending forwardly in front of said wheels, transversely spaced hull supporting bunks on said frame, a tongue member having hitch means at its forward end for connection to a towing vehicle, pivot means connecting said tongue member to said boom for vertical angular movement with respect to the boom, and boat lifting means on said trailer adjacent said pivot means, said boat lifting means being operably connected to said tongue and operable by pivotal movement of the tongue downwardly with respect to the boom to be moved upwardly above the boom to lift a boat carried by said trailer free of the hull supporting bunks.

References Cited in the file of this patent

UNITED STATES PATENTS

| | | |
|---|---|---|
| 2,219,401 | Sampsell | Oct. 29, 1940 |
| 2,588,001 | Holland | Mar. 4, 1952 |
| 2,628,733 | Hale | Feb. 17, 1953 |
| 2,708,045 | Shontz | May 10, 1955 |
| 2,733,823 | Evans | Feb. 7, 1956 |
| 2,744,643 | Hipp | May 8, 1956 |

FOREIGN PATENTS

| | | |
|---|---|---|
| 1,015,058 | France | Aug. 27, 1952 |